March 29, 1966   P. B. CLOVER   3,243,146
VERTICAL-TAKEOFF-LANDING AIRCRAFT
Filed April 27, 1964

INVENTOR.
Paul B. Clover
BY

United States Patent Office 3,243,146
Patented Mar. 29, 1966

3,243,146
VERTICAL-TAKEOFF-LANDING AIRCRAFT
Paul B. Clover, 211 Canal St., San Rafael, Calif.
Filed Apr. 27, 1964, Ser. No. 363,347
4 Claims. (Cl. 244—23)

The object of this invention is to produce aircraft capable of vertical rise, descent, and maneuverability in flight based on principles enunciated by Daniel Bernoulli, and known to students of fluid mechanics. Birds, airplanes, and helecopters utilize and airfoil that is pushed through the air. In this machine air is made to flow over the airfoil inducing lift then discharging downward producing thrust.

Figure 1:
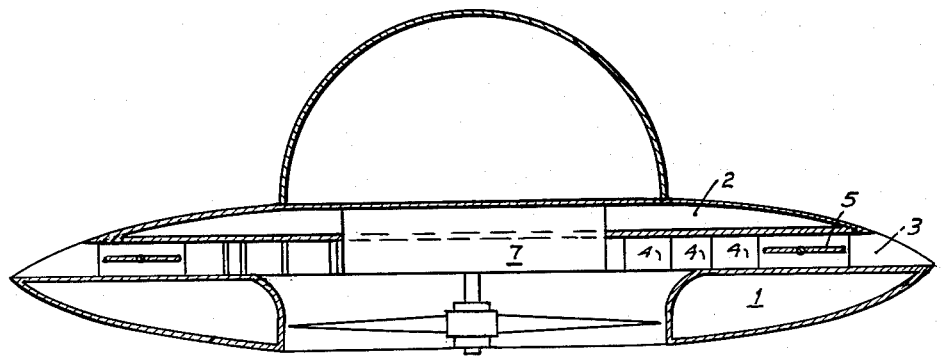
Figure 2:
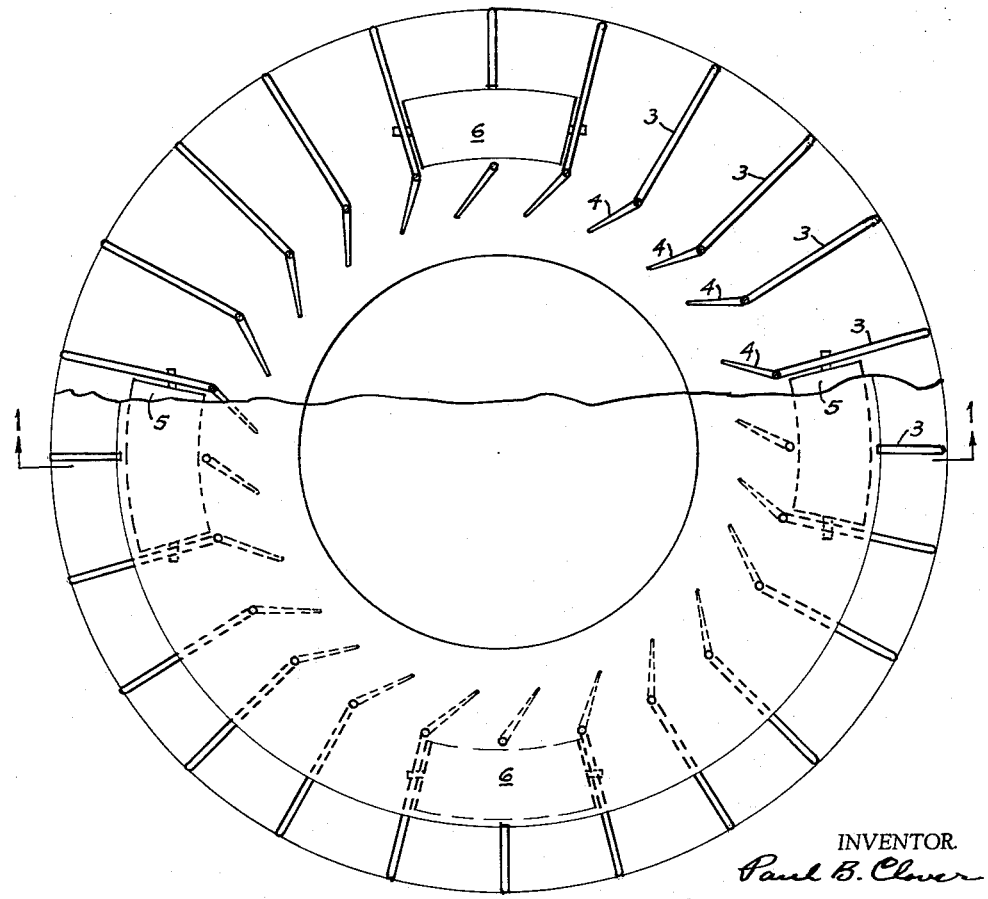

Reference to the drawings indicates a sectional view of the aircraft in FIG. 1, taken along the horizontal diameter, and a plan view with part of the cap cut away to expose the structure in FIG. 2.

The aircraft consists of an airfoil 1, cap 2, supports 3, torque vanes 4, fore and aft ailerons 5, lateral ailerons 6, and a power plant 7 together with a propeller, fan, or other means for moving air. When assembled as shown on the drawings with the power plant in operation, air is drawn through openings at the outer edge over the airfoil in a plane perpendicular to the power plant axis then discharged downward parallel to the axis of the power plant. Lift is produced by the lower-than-atmospheric pressure over the upper surface of the airfoil coupled with thrust from the discharging air. Loads may be carried within the structure of the airfoil and cap or an enclosure on the cap. Construction methods and materials are those commonly used for aircraft.

The airfoil 1 and cap 2 are spaced and secured in their proper relative positions by means of the supports 3. The supports may be simple structural members such as posts or they may be vanes as shown serving to direct air smoothly over the airfoil while acting as airfoil stiffeners. The cap may serve as an anchor for the power plant or the power plant may be anchored independently to the airfoil. The three parts airfoil, cap, and supports enclose the power space causing incoming air to move in proper relation to the airfoil to produce lift and thrust.

The torque vanes 4 can be either fixed, movable, or a combination of fixed and movable vanes. They are placed in the induced air stream and connected to convention controls. They serve to prevent undesired rotation about the power plant axis, also enable the aircraft to rotate as desired to face in any direction.

Fore and aft ailerons 5 and lateral ailerons 6 are placed in the induced air stream and connected to the conventional aircraft control system for stability and maneuvering. Tilting the aircraft in the desired direction of flight by means of the fore and aft ailerons produces a horizontal force component and movement in that direction. Flight is facilitated by low edge resistance due to intake of air and exterior streamlining.

The power plant 7 together with propeller, fan, or other methods of moving air may be of conventional type adaptable to used.

It is important to note that considerable flexibility in the design of the aircraft and its parts may be employed without destroying its ability to function. The drawings indicate an aircraft that is circular in plan with a given number of supports and torque vanes. The circular plan might be modified by eliminating circular segments from opposite sides of the airfoil leaving the fore and aft sections to produce lift thus making the aircraft narrower in the lateral direction. Again the craft might be made thicker or thinner in section, the airfoil might incorporate landing gear, and the number of torque vanes and supports increased or decreased to suit a particular design. In short all parts of the aircraft can be modified to some extent from those shown so long as their basic functions are not impaired.

I claim as my invention:

1. An aircraft comprised of a circular airfoil with an integral center opening and an impelling means for moving air mounted axially and operatively therein; said airfoil supporting a cover spaced above and mounted axially with the airfoil opening defining a duct within which, and operatively mounted on the supporting structure, a number of pivoted aileron-like surfaces and a plurality of vane-like surfaces pivoted to contact the inlet airstream on both faces providing means for control and stability; said impelling means operating to draw air inwardly over the upper surface of the airfoil producing a negative pressure and resultant lift, thence around the faces of control surfaces within the duct, thence ejected downwardly producing thrust.

2. An aircraft comprised of a circular airfoil modified by the omission of a number of chordal segments from the periphery with an integral central opening and an impelling means for moving air mounted axially and operatively therein; said airfoil supporting a cap spaced above and mounted axially with the airfoil opening defining a duct within which, and operatively mounted on the supporting structure, a number of movable aileron-like surfaces and a number of vane-like surfaces some fixed and some movable to contact the inlet airstream on both faces providing means for control and stability; said impelling means operating to draw air inwardly over the upper surface of the airfoil, thence around the faces of control surfaces within the duct, thence ejected from the aircraft.

3. A control unit for an aircraft as described in claim 2 wherein said aileron-like surfaces are operatively mounted on the supporting structure within said duct by means of pivots or hinges, said surfaces in contact with the airstream and connected to actuating means whereby movement of the surfaces deflect the airstream with resultant forces deflecting the aircraft providing a means for lateral and fore and aft control and stability.

4. A control unit for an aircraft as described in claim 2 wherein said vane-like surfaces either movable or some fixed are operatively mounted on the supporting structure within said duct by means of pivots or hinges for movable vanes and rigid connections for fixed vanes, said movable vane-like surfaces in contact with the airstream connected to actuating means whereby the vanes function to deflect the airstream with resultant forces deflecting the aircraft providing a means for torque and turning control.

References Cited by the Examiner

UNITED STATES PATENTS

| | | | |
|---|---|---|---|
| 2,718,364 | 9/1955 | Crabtree | 244—12 |
| 2,876,964 | 3/1959 | Streib | 244—12 |
| 2,972,455 | 2/1961 | Borchers | 244—23 X |
| 2,990,137 | 6/1961 | Willis | 244—12 |

MILTON BUCHLER, *Primary Examiner.*

L. C. HALL, *Assistant Examiner.*